US006914525B2

(12) United States Patent
Rao et al.

(10) Patent No.: US 6,914,525 B2
(45) Date of Patent: Jul. 5, 2005

(54) ALERT SYSTEM AND METHOD FOR GEOGRAPHIC OR NATURAL DISASTERS UTILIZING A TELECOMMUNICATIONS NETWORK

(75) Inventors: Herman Rao, Taipei (TW); Ching-Hsiang Hsu, Taipei (TW); Jung Nan Hung, Tainan (TW); Chih-Kung Lee, Taipei (TW); Wen-Jong Wu, Junghe (TW); Wen-Hsin Hsiao, Taichung (TW); Chun-Kuang Chen, Taipei (TW); Yih-Fan Chen, Taipei (TW); Yi-Chun Chen, Hualien (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 0 days.

(21) Appl. No.: 10/286,048

(22) Filed: Oct. 29, 2002

(65) Prior Publication Data

US 2004/0075552 A1 Apr. 22, 2004

(51) Int. Cl.[7] .................................................. H04Q 1/30

(52) U.S. Cl. .................................. 340/531; 340/539.26

(58) Field of Search ............................ 340/531, 539.26, 340/539.22, 539.13, 539.17, 601; 702/2, 3

(56) References Cited

U.S. PATENT DOCUMENTS 5,532,679 A * 7/1996 Baxter, Jr. ............. 340/539.26
5,708,655 A * 1/1998 Toth et al. .................. 370/313
5,896,376 A * 4/1999 Alperovich et al. ........ 370/348
5,914,656 A * 6/1999 Ojala et al. ................. 340/521
6,002,748 A * 12/1999 Leichner ...................... 379/48
6,023,223 A * 2/2000 Baxter, Jr. .................. 340/531
6,031,455 A * 2/2000 Grube et al. ........... 340/539.26
6,052,591 A * 4/2000 Bhatia ........................ 455/445
6,097,288 A * 8/2000 Koeppe, Jr. ................. 340/517
6,148,212 A * 11/2000 Park et al. ............... 455/456.1
6,252,510 B1 * 6/2001 Dungan ...................... 340/632
6,255,942 B1 * 7/2001 Knudsen ..................... 340/506
6,317,029 B1 * 11/2001 Fleeter .................... 340/10.32
6,392,538 B1 * 5/2002 Shere .................... 340/539.26

* cited by examiner

*Primary Examiner*—John Tweel, Jr.
(74) *Attorney, Agent, or Firm*—Baker & McKenzie LLP

(57) ABSTRACT

The invention advantageously provides an alert system and method for geographic or natural disasters that utilize a telecommunications network for monitoring geographic data in disaster-prone areas and accordingly issuing warnings against potential disasters to people inside the monitored area. An alert system according to a preferred embodiment of the invention comprises a telecommunications service network, one or more wireless sensor modules and a control center. The telecommunications network according to this particular embodiment includes service coverage over the monitored areas. The wireless sensor modules are installed to selected locations inside monitored areas. Each of the sensor modules further comprises at least one sensor for collecting geographic or geodetic data and a wireless communications unit for sending collected geographic data to the control center via the telecommunications network. The control center then receives and processes the monitored geographic or geodetic data sent by the wireless sensor modules for further algorithmic analysis. The control center accordingly issues alerts for imminent geographic or natural disasters if the processing of the geographic or geodetic data produces adverse results.

29 Claims, 10 Drawing Sheets

*System Configuration*

ALERT SYSTEM AND METHOD FOR GEOGRAPHIC OR NATURAL DISASTERS UTILIZING A TELECOMMUNICATIONS NETWORK

BACKGROUND OF THE INVENTION

1. Field of the Invention

The present patent application generally relates to the monitoring and detection of geographic or natural disasters, and more particularly, to a telecommunications network-based system and method for the monitoring and detection of geographic or natural disasters such as mudslides, landslides and avalanche caused by climatic and seismic forces.

2. Description of the Related Art

Land use and overdevelopment beyond reasonable levels in densely populated areas, particularly the hills and mountains, may lead to disastrous results. Geographic calamities such as by mudslides and avalanches cost human lives and property. The risk of such geographic calamities is high even in cases of minimal land exploitation. Geographic or natural disasters in minimum land exploitations are exacerbated by climatic and seismic events such as typhoons, torrential rains or earthquakes. Surface geological or geodetic damages often result following these natural disasters. The costs in human life and property are intolerably high if these natural disasters are poorly monitored and undetected.

Radar or weather monitoring systems and methods in the art can provide forecasts of heavy rain or typhoons. However, these systems and methods in the art cannot properly predict geological or geodetic damage resulting from natural disasters. These shortcomings in the systems and methods in the art are disadvantageous in preventing surface geological or geodetic damage and saving human life and property.

There is thus a general need in the art for an alert system and method for monitoring geographic or natural disasters. In particular, a need in the art exists for a system and method for monitoring and detection of geographic or natural disasters in unstable hilly and mountainous areas for minimizing the loss of life and property. Moreover, there is a need in the art for an alert system and method for monitoring geographic or natural disasters with a large coverage area in a cost-effective manner.

SUMMARY OF THE INVENTION

The invention advantageously provides an alert system and method for monitoring geographic or natural disasters utilizing a telecommunications network that provides timely warning at optimally reduced costs. The invention further provides an alert system and method for monitoring geographic or natural disasters utilizing a telecommunications network that is flexible and efficient in providing timely warning for preventing loss of human life and property in the event of a geographic or natural disaster.

A preferred embodiment of the invention advantageously provides an alert system and method for monitoring geographic or natural disasters that utilize a telecommunications network for monitoring geographic or geodetic data in disaster-prone areas and accordingly issuing warnings against potential disasters to people inside the monitored area. The alert system according to this particular embodiment of the invention comprises a telecommunications service network, one or more wireless sensor modules and a control center. The telecommunications network according to this particular embodiment includes service coverage over the monitored areas. The wireless sensor modules are installed to selected locations inside monitored areas. Each of the sensor modules further comprises at least one sensor for collecting geographic or geodetic data and a wireless communications unit for sending collected geographic data to the control center via the telecommunications network. The control center then receives and processes the monitored geographic or geodetic data sent by the wireless sensor modules for further algorithmic analysis. The control center accordingly issues alerts for imminent geographic or natural disasters if the processing of the geographic or geodetic data produces adverse results.

Another embodiment of the alert system and method for monitoring natural disasters according to the invention further comprises at least one alert issue station set up at selected locations inside the monitored areas. The alert issue stations issue warnings to people inside the monitored areas if the processing of the geographic or geodetic data produces adverse results. In yet another embodiment of the alert system and method for monitoring natural disasters according to the invention, at least one rescue unit stationed at a designated location is provided inside the monitored areas. The rescue unit prepares to provide rescue to people inside the monitored areas if the processing of the geographic or geodetic data produces adverse results.

A preferred embodiment of the method for monitoring disasters according to the invention primarily comprises the steps of providing communications coverage over at least one monitored area with a telecommunications network, providing at least one wireless sensor module in the at least one monitored area, collecting geographic and geological data therein, processing the collected data at a control center, determining a likelihood of disaster based on the collected data, and issuing a disaster alert if the likelihood of disaster is determined to be relatively high or substantial. The collected data can further comprise water level, earth movement, position shifts, vibration and acceleration.

In further embodiments, the method for monitoring disasters according to the invention can further comprise the step of relaying the disaster alert throughout the at least one monitored area. Moreover, the method for monitoring disasters according to the invention can further comprise the step of relaying the collected data to the control center using a microcontroller connected to the at least one wireless sensor module.

In additional embodiments, the method for monitoring disasters according to the invention can further comprise the step of providing operating information for the alert system using a geographic information system (GIS). The operating information can further comprise a location of mudflow, geological conditions in the at least one monitored area, and a location of the at least one wireless sensor module. Furthermore, the method for monitoring disasters according to the invention can further comprise the steps of setting operating parameters for the at least one wireless sensor module and overseeing maintenance operations using a sensory and communication control (SCC).

In other embodiments, the method for monitoring disasters according to the invention can further comprise the step of gathering weather information using a weather data receiving subsystem (WDRS). In addition, the method for monitoring disasters according to the invention can further comprise the step of setting processing priorities for the collected data.

In yet additional embodiments, the method for monitoring disasters according to the invention can further comprise the step of providing subscriber information to the alert system, location and total number of the at least one wireless sensor module, geographic and geological conditions of the at least one monitored area in a database and web service subsystem (DWSS). Moreover, the method for monitoring disasters according to the invention can further comprise the step of hosting a web service for allowing access to the alert system.

Therefore, the invention advantageously provides an optimal system and method for monitoring and detection of geographic or natural disasters in unstable hilly and mountainous areas, substantially minimizing the loss of human life and property within a large coverage area in a cost-effective manner.

BRIEF DESCRIPTION OF THE DRAWINGS

The foregoing features and advantages of the invention will become more apparent in the following Detailed Description when read in conjunction with the accompanying drawings (not necessarily drawn to scale), in which.

DETAILED DESCRIPTION OF PREFERRED EMBODIMENTS

The invention advantageously provides a system and method for monitoring geographic or natural disasters with a plurality of sensors distributed in the monitored area. Each sensor is advantageously equipped with detection capability and accordingly detects signs of disasters with adequate frequency for timely issuing alerts prior to the actual occurrence of natural disasters. In particular, an alert system and an alert method according to a preferred embodiment of the invention cover the monitored area with sensors capable of picking up parameters such as earth movement and water precipitation in key locations within the area. Moreover, the abundant and frequent data gathered by system sensors are advantageously processed in real-time by a computer or network system at a centralized location. Sensors of the system and method according to the invention are flexibly adjustable in both their detection characteristics and performance in response to changes in climatic and weather conditions in the monitored area. For example, data gathering frequency of a water sensor used to monitor water level is accordingly increased during a typhoon or heavy rain.

Figure 1:
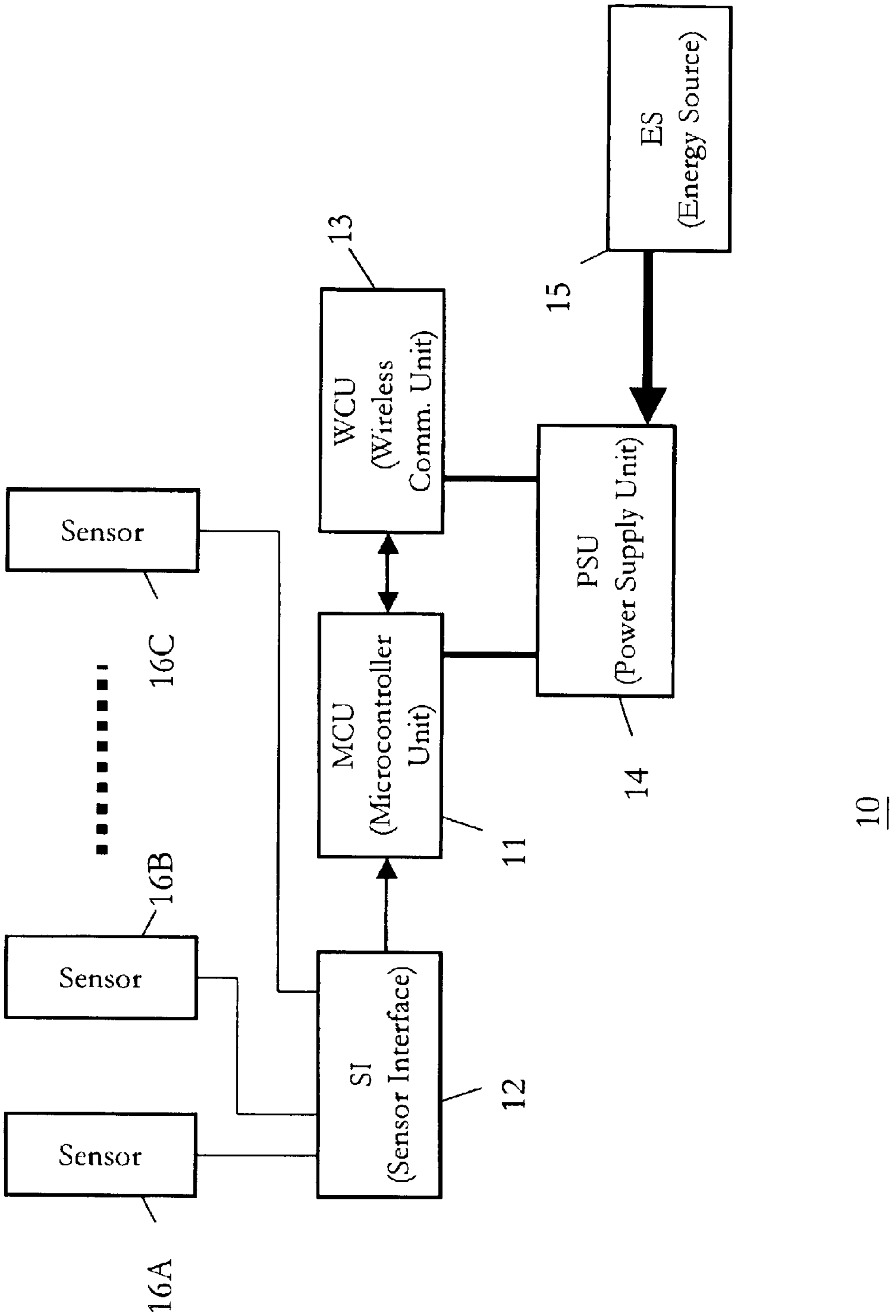
FIG. 1 is a block diagram illustrating a wireless sensor module for an alert system for monitoring geographic or natural disasters utilizing a telecommunications network in accordance with a preferred embodiment of the invention.

FIG. 1 is a block diagram that illustrates a wireless sensor module 10 for an alert system and method for monitoring geographic or natural disasters utilizing a telecommunications network in accordance with a preferred embodiment of the invention. The wireless sensor module 10 advantageously includes data gathering capability and constitutes a basic building block of an alert system and method for monitoring disasters according to a preferred embodiment of the invention.

Referring to FIG. 1, a wireless sensor module 10 comprises a plurality of sensors 16A, 16B, . . . and 16C, which are connected to a microcontroller (MCU 11) through an integral interface circuit, i.e., the sensor interface SI 12. Each of the sensors is able to relay the respectively collected data to the MCU 11 for processing. MCU 11 can be arranged to relay the information collected by the sensors back to a remote control center after initial processing. Initial processing of the collected information may include assembling the information into a suitable format for transmission. The sensors 16A, 16B, . . . and 16C installed in the wireless sensor module 10 may include various types of sensors for picking up monitoring information including, e.g., water level, earth movement, position shifting, vibration, and acceleration. These are parameters being monitored in providing timely alert of imminent geographic or natural disasters. For example, photo interrupters, proximity switches and sliding resistance meters can detect the magnitude of geological or geodetic position shifts, whereas mercury switches can detect the occurrence of geological or geodetic tilting. As the velocity of sound wave transmission varies in different geological substances, ultrasonic sensors can detect the change of underground water level, whereas strain gauges can measure gravitational loads.

Different sensor data collected by sensors 16A, 16B, . . . and 16C of the module 10 are subject to initial processing by the MCU 11 for transmission by a wireless communications unit WCU 13. The pre-processed information is then relayed back to a processing center, generally at a remote location from the module 10. At the processing center, information received from the monitored areas is then analyzed, where warnings are accordingly issued when a potential geographic disaster is determined to be likely according to the result of the analysis.

Wireless sensor module 10 further comprises a power supply unit, PSU 14, which provides operational power to the constituent components of the module 10, MCU 11 and the WCU 13. PSU 14 may feed on an energy source, ES 15, which is, e.g., a solar panel that collects solar energy. This is particularly suitable for applications in which the module 10 is remote from utility power supply, as is frequently the case when the system includes a configuration that requires a large number of wireless sensor modules 10 to cover large geographical areas. The module 10 can also be deployed with energy sources such as batteries or landline utility power.

Figure 2:
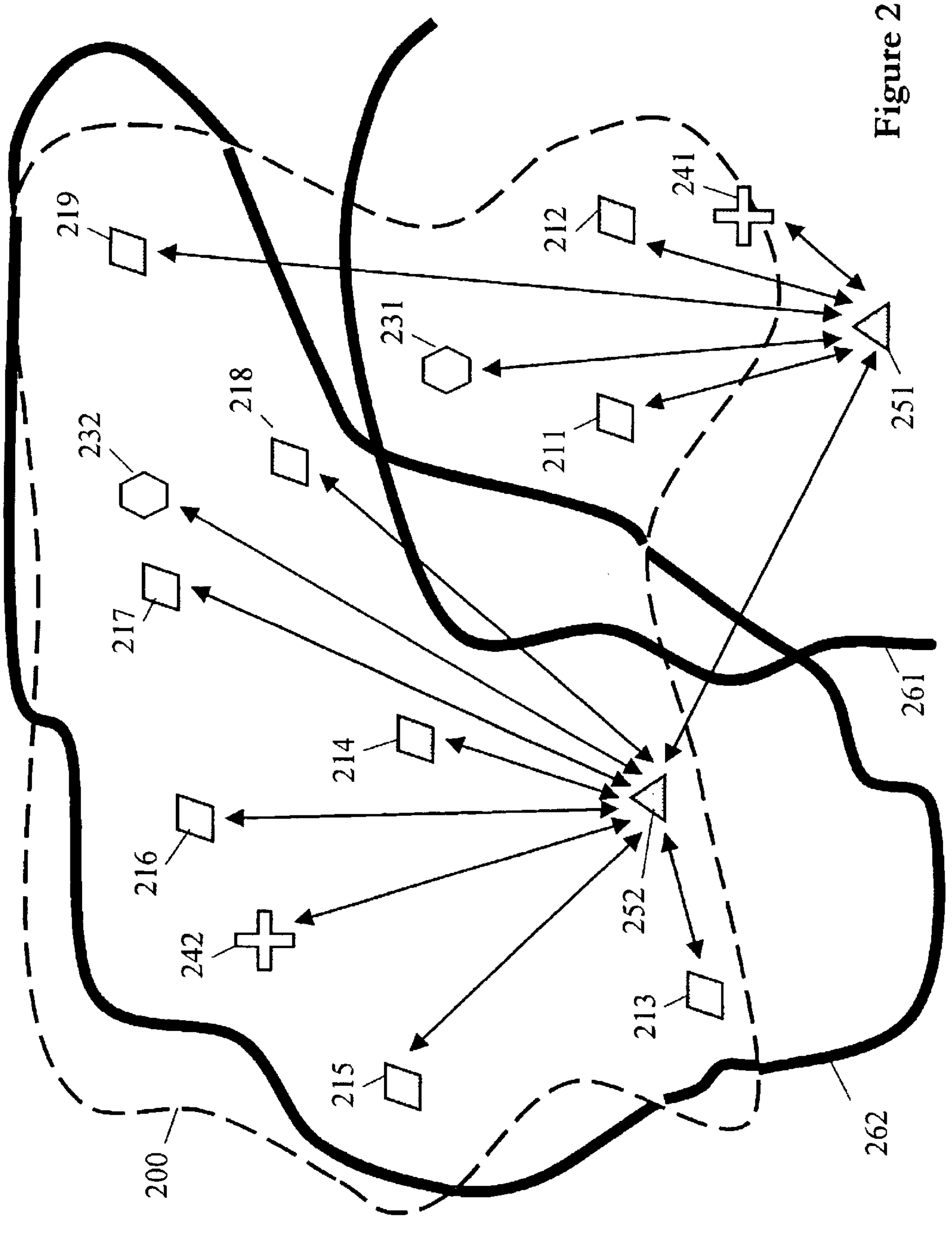
FIG. 2 is a schematic view illustrating the construction of an alert system according to another embodiment of the invention deployed in and fully covering a monitored area for geographic or natural disasters.

FIG. 2 is a schematic view that illustrates a construction of an alert system according to another embodiment of the invention deployed in and fully covering a monitored area for geographic or natural disasters. Referring to FIG. 2, each of the sensor modules identified by reference numerals 211, 212 and 219 are wireless sensor modules generally similar to module 10 described in conjunction with FIG. 1. Each of these modules 211, 212 and 219 is deployed to its designated location in a monitored area 200 according to the design of the alert system in accordance with this particular embodiment of the invention.

Alert issue stations 231 and 232 as well as rescue units 241 and 242 are provided inside the monitored area 200 where geographic or natural disasters may occur. Stations 231 and 232 that issue alerts on potential disasters can be set up at locations with relatively high population density within the area 200, with proximately located rescue units 241 and 242 in case rescue efforts are needed. The system described in conjunction with FIG. 2, as deployed in the area 200, is shown to include a communications relay 252 positioned therein, where another relay 251 is located outside of the area 200.

Each of the communications relay facilities 251 and 252 includes respective relay service coverage range 261 and 262 as outlined in coarse lines. Combination of the two relays 251 and 252 is sufficient to cover the wireless communications needs for the entire monitored area 200. Such full coverage advantageously allows all the functional components of the system according to the invention (i.e., wireless sensor modules 211, . . . 219, alert issue stations 231 and 232, as well as rescue units 241 and 242) to be tied together in a single communications system. This single communications system allows bi-directional communication between any components in the system deployed in the monitored area 200 whenever necessary. If required, the relay 251 outside of the monitored area 200 can communicate with other similar or compatible relay facilities in its proximity (not shown in FIG. 2) so as to connect the system as deployed in area 200 to a remotely located control center. This effectively connects each individual component in the system to the processing facility in the control center.

In an exemplary scenario, the two wireless communications relays 251 and 252 that fully cover the entire monitored area 200 may be utilized to send all data gathered by wireless sensor modules back to the control center. Based on the received data representing geographic or geodetic conditions inside the monitored area 200, the control center conducts analyses with other reference parameters (such as seasonal factors) taken into consideration. Should the analysis result indicate a substantial likelihood of imminent geographic or natural disasters, instructions can accordingly be issued by the control center to the alert issue stations 231 and 232 via a communications channel through the relays 251 and 252. People inside the monitored area 200 and within service range of the alert issue stations can immediately be informed and instructed to take appropriate precautions or leave the area 200. In addition, rescue units 241 and 242 stationed inside or close to the monitored area 200 can be instructed through the same communications channel to be on a heightened standby status in preparation for the pending disasters. The likelihood of casualty and property loss is advantageously kept to a minimum should the disasters do strike the monitored area 200.

Figure 3:
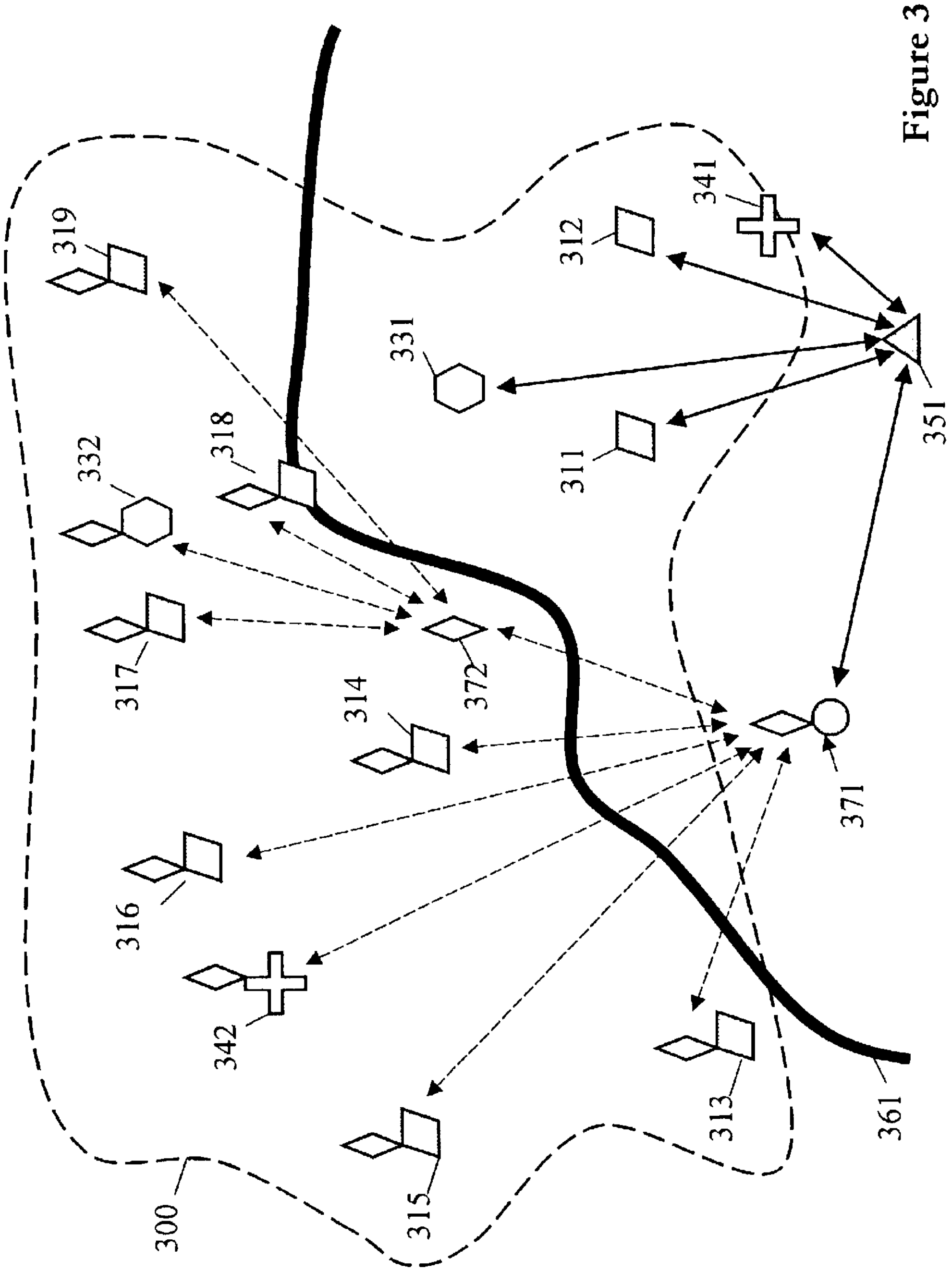
FIG. 3 is a schematic view illustrating the construction of an alert system according to yet another embodiment of the invention deployed in but not fully covering a monitored area for geographic or natural disasters.

FIG. 3 is a schematic view that illustrates the construction of the alert system deployed in but not fully covering a monitored area for geographic or natural disasters. The monitored area 300 as shown in FIG. 3 is similar to the monitored area 200 described in conjunction with FIG. 2. Wireless sensor modules 311, 312, . . . and 319, alert issue stations 331 and 332, and rescue units 341 and 342 of the alert system as shown in FIG. 3 are deployed to their respective locations, similarly deployed as the components in the alert system as shown in FIG. 2. No communications relay facility is installed inside the monitored area 300 in FIG. 3, although one relay 351 with service coverage 361 is installed outside or about the periphery of the monitored area 300. The relay 351 partially covers the monitored area 300, with wireless sensor modules 311 and 312, alert issue station 331 and rescue unit 341 within its respective relay service range. All other components, including wireless sensor modules, alert issue stations and rescue units deployed inside the monitored area 300, are not serviced by the relay 351.

In connecting these components to the communications network, an independent wireless communications device is installed. For example, independent wireless communications device 371 is set up at a location inside the service range 361 of relay 351, which is also communicable with all components not serviced by relay 351 (e.g., wireless sensor modules 313, 314, 315, 316, 317, 318 and 319, alert issue station 332 and rescue unit 342). With the presence of the independent wireless communications device 371, all components outside of service range 361 of relay 351 are still accessible in the alert system deployed in the monitored area 300.

The exemplary wireless communications network employed in the system as described in conjunction with FIGS. 2 and 3 can be any telecommunications networks extending service coverage to or near the monitored area. For example, cellular mobile telephone systems including GSM (Global System for Mobile communications) are applicable for use with the alert system according to the invention. If GSM is utilized to provide the backbone communications framework for the alert system, conesponding wireless sensor modules with communications processing circuit, the WCU 13, capable of conducting GSM communications are accordingly provided. Independent wireless communications devices of standards such as citizen' band (CB) radios are also applicable for use with the alert system according to the invention if commercial telecommunications services (such as GSM) are nor available in or near the monitored area.

Figure 4:
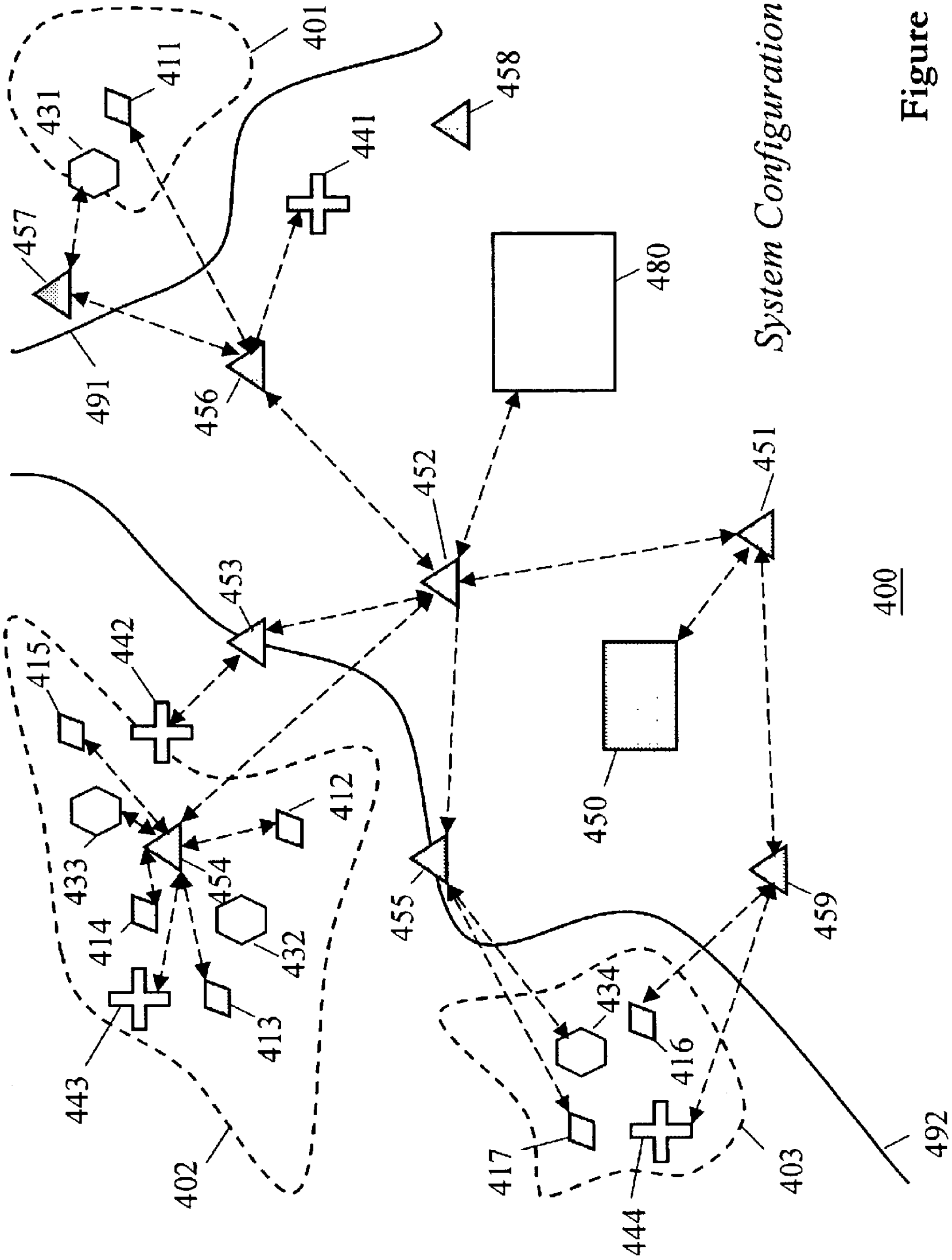
FIG. 4 is a schematic view illustrating the system configuration of an alert system and method for monitoring geographic or natural disasters utilizing a telecommunications network in accordance with another preferred embodiment of the invention.

FIG. 4 is a schematic view that illustrates the system configuration of an alert system and method for monitoring geographic or natural disasters utilizing a telecommunications network in accordance with another preferred embodiment of the invention. The alert system 400 of FIG. 4 comprises a control center 480, a wireless communications network that includes a plurality of communications relays 451, 452, . . . and 459 under control of the control center 480, and a number of monitored areas 401, 402 and 403 respectively set up in the corresponding geographic regions 491 and 492 for disaster monitoring. Each of the monitored geographic regions can include scattered therein a plurality of wireless sensor modules, alert issue stations and rescue units similar to those described in conjunction with FIGS. 2 and 3.

For example, a total of four wireless sensor modules 412, 413, 414 and 415, two alert issue stations 432 and 433, and a rescue unit 443 are installed inside the monitored area 402.

Referring to FIG. 4, another rescue unit 442, located on or about the periphery of the monitored area 402, is assigned to provide rescue services to the monitored area 402. All the system components of the alert system 400 except the rescue unit 442 are covered by the communications service provided by the relay 454 located inside the monitored area 402. Rescue unit 442 can establish communications contact with all other components in the system 400 via another relay 453 in its proximity. This allows the rescue unit 442 to be tied to the communications network via an alternate communications path.

Furthermore, that the alert system 400 can be employed to provide service to more than one geographical region for disaster monitoring. Monitored areas such as those described in conjunction with FIGS. 2 and 3 can be covered by a single alert system according to the invention. In FIG. 4, three monitored areas 401, 402 and 403 (as enclosed by dotted lines) are included for the disaster monitoring service provided by the alert system according to the invention. All the monitored areas 401, 402 and 403 are integrally controlled under one control center 480 with a telecommunications network such as GSM. An efficient and expedient bi-directional communications channel is thus established in accordance with the invention between the control center 480 and any of the system components (e.g., wireless sensor module, alert issue station or rescue unit) whenever necessary. Communications within the alert system 400 of FIG. 4 involve the return of collected data by the wireless sensor modules back to the control center, and transmission of instructions from the control center to an alert issue station for issuing the disaster alert. These two-way communications are as depicted in FIG. 4 using dotted lines with arrowheads representing bi-directional communications traffic.

Figure 5:
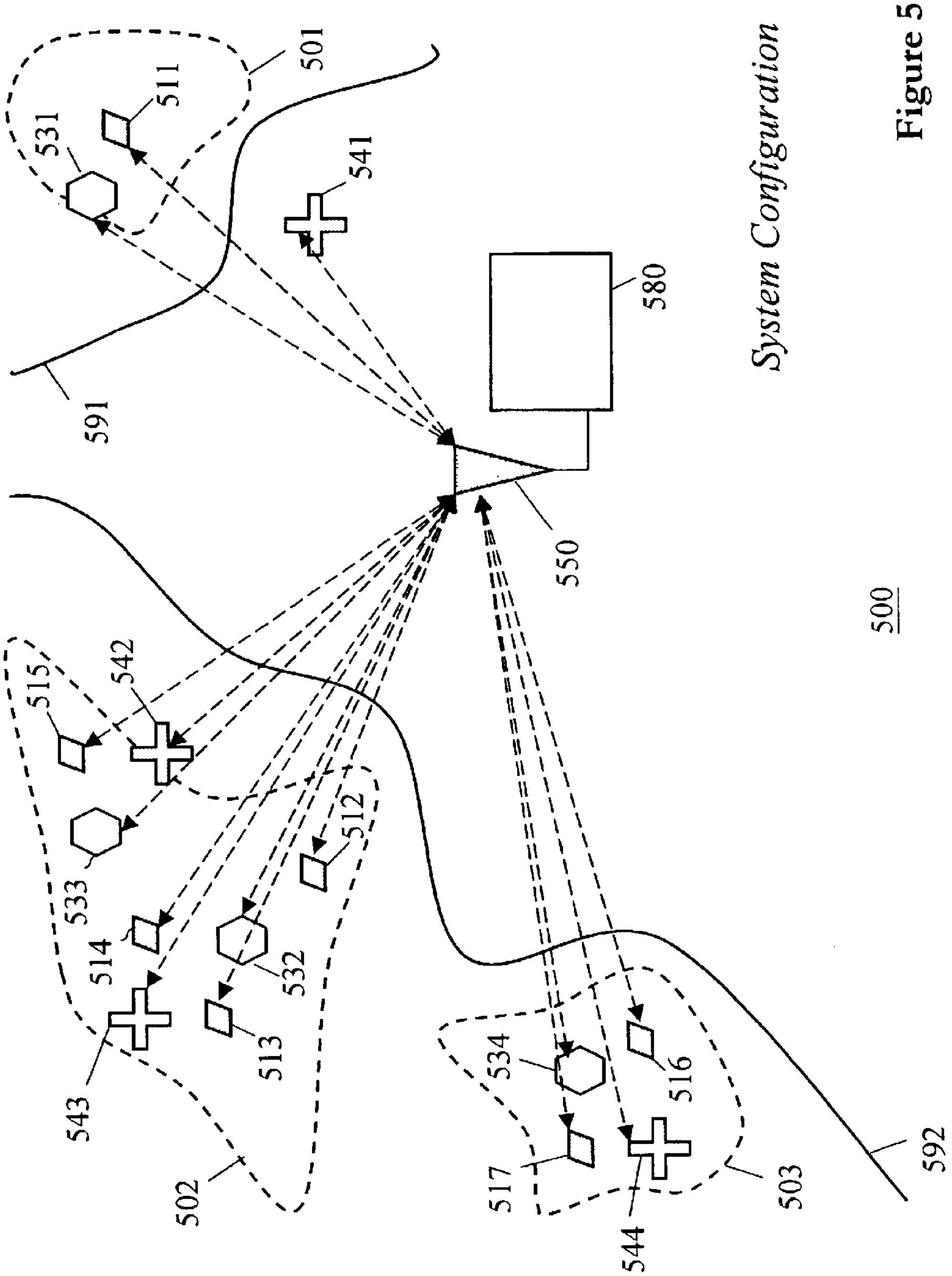
FIG. 5 is a schematic view illustrating the system configuration of an alert system and method for monitoring geographic or natural disasters utilizing a telecommunications network in accordance with yet another preferred embodiment of the invention.

FIG. 5 is a schematic view that illustrates the system configuration of an alert system and method for monitoring geographic or natural disasters utilizing a telecommunications network in accordance with yet another preferred embodiment of the invention. The alert system 500 comprises a control center 580 and a communications center 550 covering one or more monitored areas 501, 502 and 503.

Compared with the alert system 400 as shown in FIG. 4, the alert system 500 includes an alternate communications network configuration. Otherwise, both systems are substantially similar in terms of the functional components deployed in the monitored areas. In particular, the wireless sensor modules 511, 512, . . . and 517, alert issue stations 531, . . . and 534, and the rescue units 541, . . . and 544 are similarly provided as those in the alert system 400 of FIG. 4. The difference in the communications framework stems from the fact that the system 400 of FIG. 4 relies on a commercial telecommunications networks such as GSM, whereas the system 500 of FIG. 5 depends, at least partially, on long-distance two-way radio communications channels.

A transceiver installed in the communications center 550 of the alert system 500 is able to set up a bi-directional communications channel between the control center 580 and any of the functional components deployed at the remote sites in the monitored area. The wireless communications unit (WCU) for each of the wireless sensor modules is equipped with radio equipment compatible with the radio equipment provided at the communications center 550. The control center 580 of the system 500 is able to communicate with all of the remote components deployed for the monitored areas (501, 502 and 503). Any of the wireless sensor modules 511, 512, . . . and 517, alert issue stations 531, . . . and 534, and rescue units 541, . . . and 544 may be called up by the control center 580 whenever necessary.

Although the communications framework for the alert systems 400 and 500 may be structurally different, both systems are capable of supporting efficient and high-speed bi-directional communications for effective disaster monitoring. To cover disaster-prone areas in which telecommunications network coverage is readily available, networks such as GSM are particularly suitable for the construction of the alert system according to the invention. For monitored areas with low population density where no or little commercial network service is available, communications networks similar to those described in conjunction with FIG. 5 can be constructed.

Figure 6:
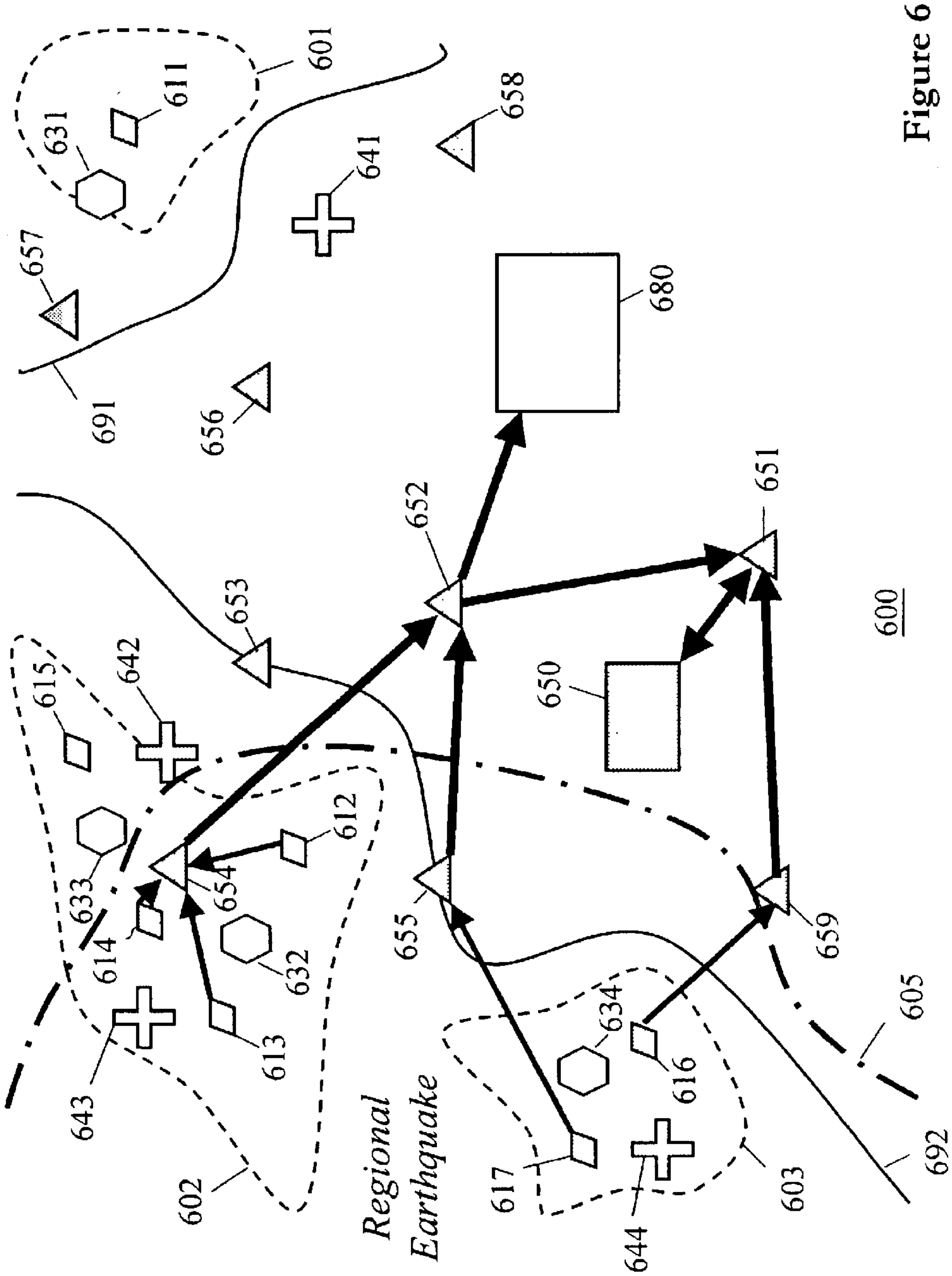
FIG. 6 is a schematic view illustrating an exemplary operation of the system of FIG. 4 after an earthquake.

FIG. 6 is a schematic view that illustrates an exemplary operation of the alert system 400 of FIG. 4 after an earthquake. Referring to FIG. 6, the earthquake affects the regions identified by coarse dotted lines 605 with localized intensities exceeding a preset value. The monitored area 603 is entirely within the region 605, whereas another monitored area 602 is only partially situated within the affected region 605. The monitored area 601 is entirely out of the region 605.

During the earthquake, the wireless sensor modules 616 and 617 deployed in the monitored area 603 and modules 612, 613 and 614 in area 602 are immediately activated to collect data for relay back to the control center 680 via relays 659, 655, 654, 652 and 651 of the communications framework of the alert system according to the invention. All these passive sensor modules deployed in the monitored areas include various types of sensors in accordance with the design of the monitoring system. These include sensors with capabilities for detecting position shifts, acceleration, as well as water level.

Sensor modules outside of areas affected by the earthquake are not required to commence data collection immediately. These include sensor module 615 in monitored area 602 and all sensor modules in area 601. These sensor modules located outside of the areas affected by the earthquake are not required to send their data immediately after the earthquake. This avoids the jamming of communications channels and overload of channel bandwidth, which are needed for the transmission of data for disaster monitoring. At the control center 680, fresh data received from the areas affected by the earthquake can be analyzed in view of factors such as rain or prior earthquakes. Based on the collected data, the likelihood of geographic or geodetic disasters is determined. Likewise, it is also determined whether the issue of an alert is warranted. If it is determined that the likelihood of disaster is relatively high or substantial, rescue units in the affected areas can be alerted to prepare for disaster relief.

Figure 7:
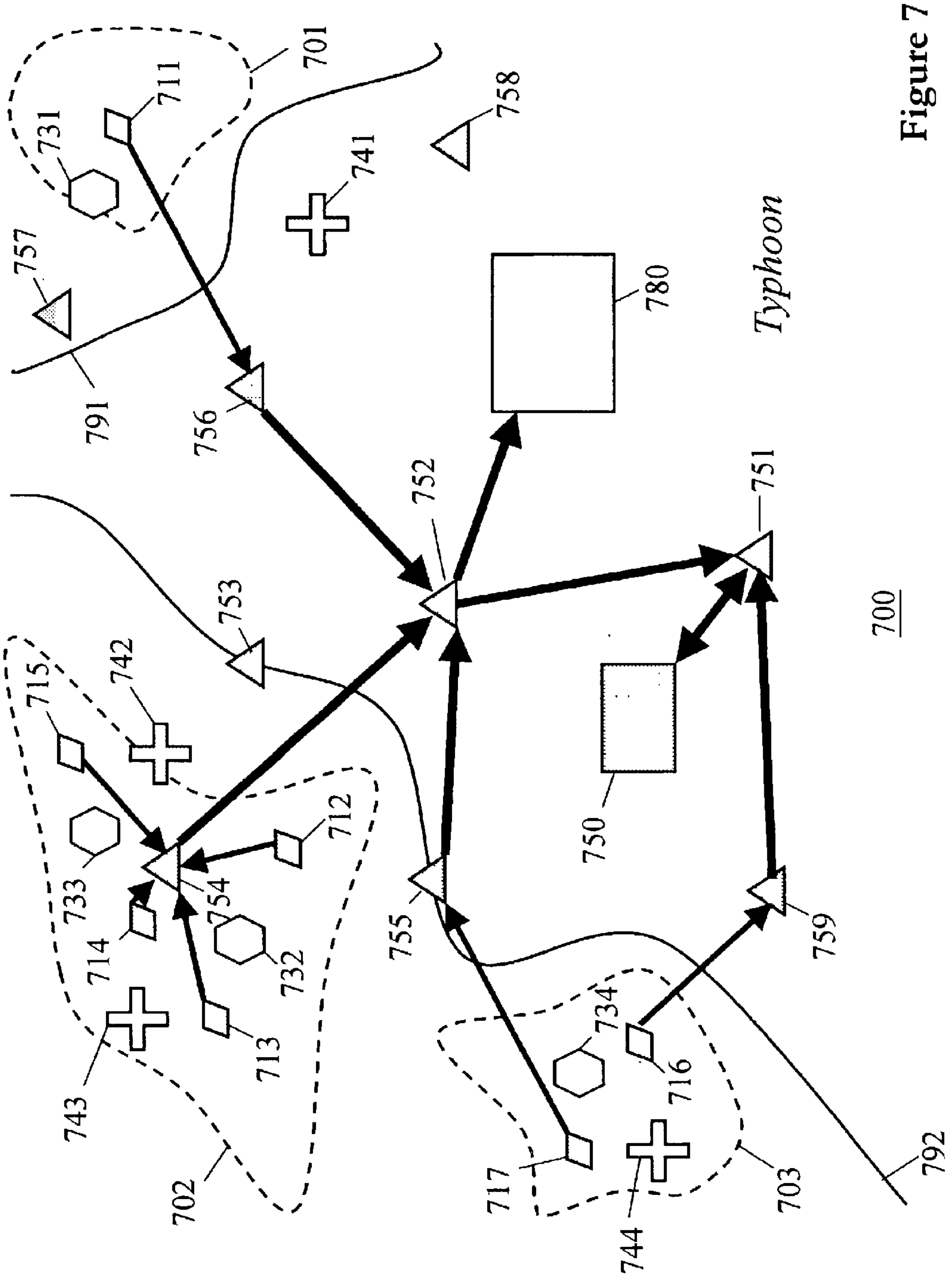
FIG. 7 is a schematic view illustrating an exemplary operation of the system of FIG. 4 during a typhoon.
Figure 8:
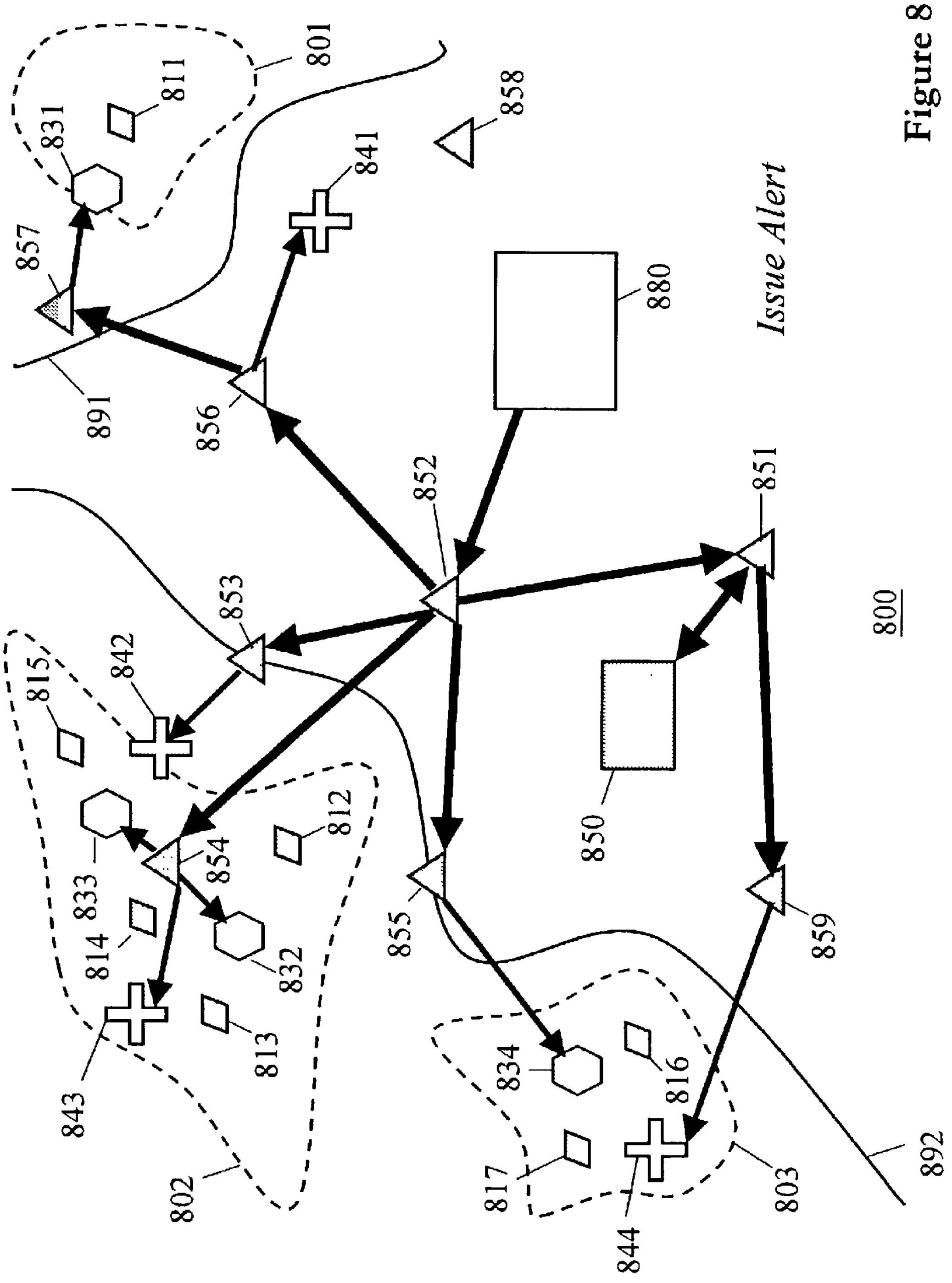
FIG. 8 is a schematic view illustrating an exemplary issuance of alert by the system of FIG. 7.

FIG. 7 is a schematic view that illustrates an exemplary operation of the alert system according to the invention as shown in FIG. 4 during a typhoon. As a typhoon enters a monitored area, all sensor modules within all of the monitored areas are mobilized to continuously collect data, or at least with a heightened frequency of data collection. All collected data are immediately relayed back to the control center 780. FIG. 8 is a schematic view that illustrates the issuance of an alert by the alert system according to the invention as shown in FIG. 7 when the likelihood of disaster is determined to be relatively high during or after the typhoon. The control center 880 of the alert system 800 instructs the alert issue stations in the monitored area to issue warnings about the imminent geographic or natural disasters through the communications channel. The rescue unit(s) in or near the typhoon-covered area are also informed and instructed to raise their readiness status.

Figure 9:
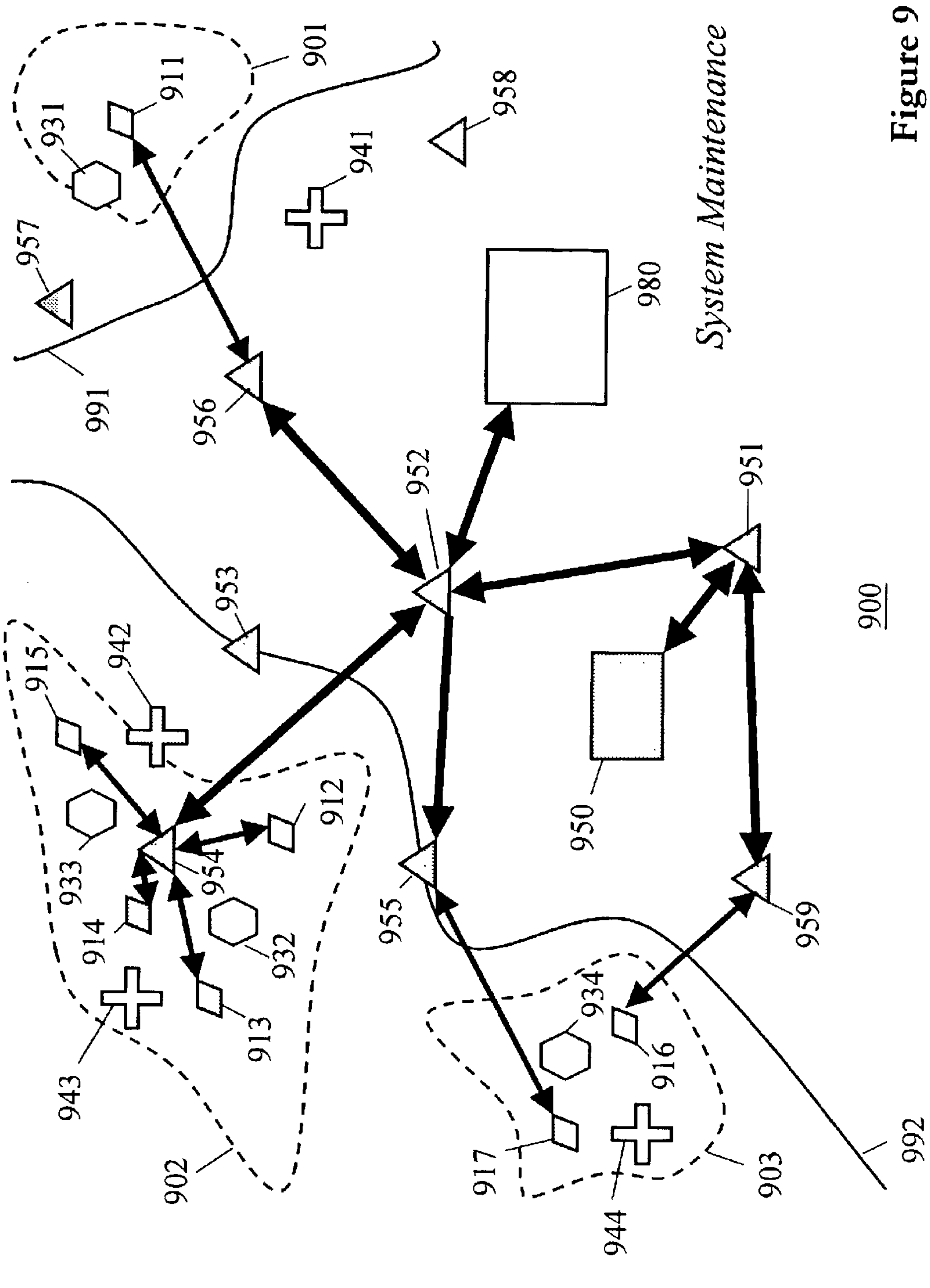
FIG. 9 is a schematic view illustrating the maintenance of an exemplary alert system for monitoring geographic or natural disasters utilizing a telecommunications network in accordance with the invention.

The alert system for monitoring geographic or natural disasters according to the invention requires maintenance efforts and can be implemented when disasters are determined to be unlikely. FIG. 9 is a schematic view that illustrates an exemplary embodiment of the alert system under maintenance in accordance with the invention. System maintenance service efforts may include, e.g., regularly scheduled maintenance and temporary adjustments. The service and maintenance efforts may be extended to all functional components of the alert system, which may be scattered across the monitored areas. Firmware upgrades may be involved for some or all these components.

Parameters considered in estimating the likelihood of potential disasters vary in accordance with changes in condition, and are continuously refined. For seasonal changes, data collected such as water level need to be dynamically processed. For example, in a prolonged period of severe weather such as heavy torrential rains, the frequency for monitoring the water level needs to be accordingly increased. Conversely, as the precipitation decreases, the frequency for monitoring the water level can be accordingly reduced. Some of the dynamic adjustments can be implemented through the wireless sensor modules without any human intervention, e.g., through firmware upgrades.

FIG. 9 is a schematic view that illustrates the alert system in accordance with yet another preferred embodiment of the invention undergoing during system maintenance. System maintenance can be initiated by the control center 980, and is implemented in the alert systems described in conjunction with FIGS. 4, 5, 6, 7 and 8.

Figure 10:
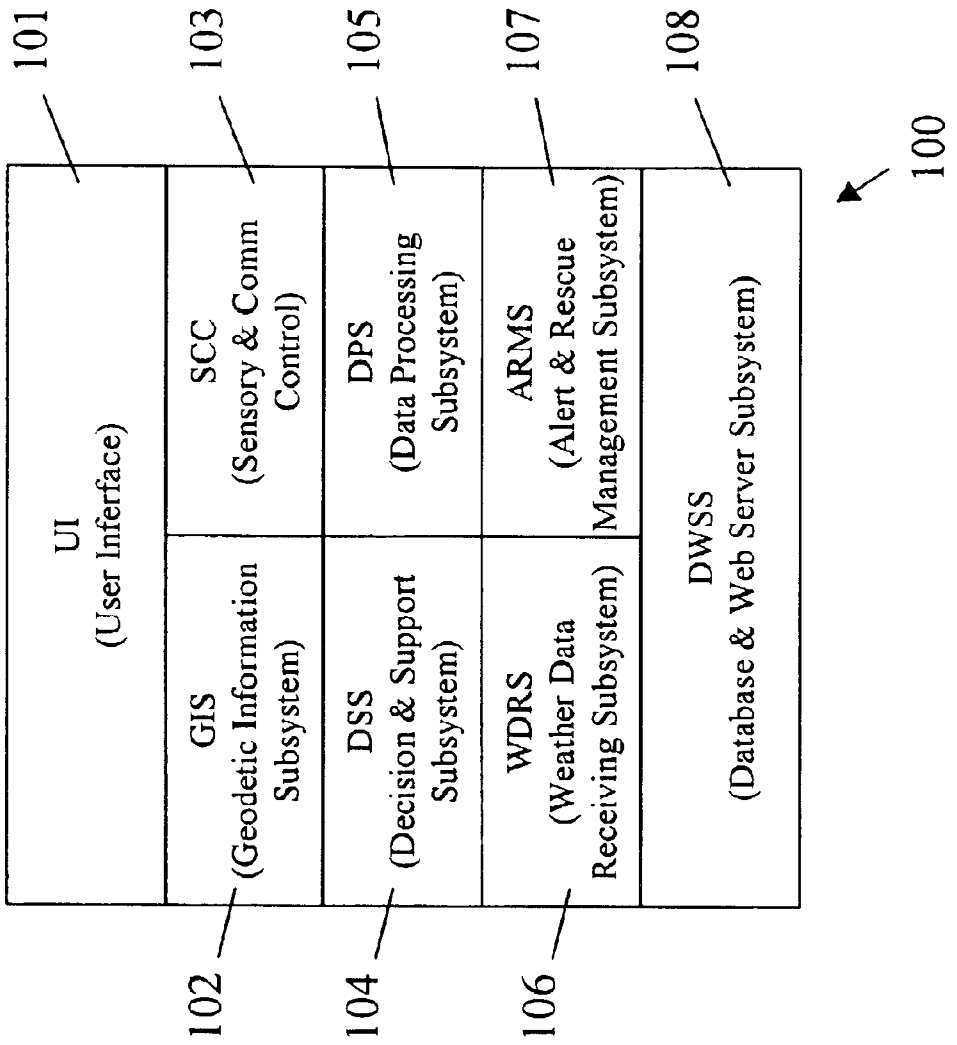
FIG. 10 is a block diagram illustrating an exemplary operating software system for the alert system and method for monitoring geographic or natural disasters utilizing a telecommunications network in accordance with yet another preferred embodiment of the invention.

FIG. 10 is a block diagram that illustrates an exemplary software system for the alert system for geographic or natural disasters utilizing a telecommunications network in accordance with yet another preferred embodiment of the invention. The software system comprises a user interface (UI) 101, a geographic information subsystem (GIS) 102, a sensory and communications control (SCC) 103, a decision and support subsystem (DSS) 104, a data processing subsystem (DPS) 105, a weather data receiving subsystem (WDRS) 106, an alert and rescue management subsystem (ARMS) 107, and a database and web server subsystem (DWSS) 108.

The software system can be implemented by the controlling system installed in the control center of the alert system according to the invention. The control center determines the alert status in the monitored areas based on a predetermined algorithm for disaster prediction modeling system. In determining the alert status for a monitored area, various parameters are processed for algorithmic analyses. The user interface UI 101 serves as the interface between the alert system according to the invention and the human operator. The geographic information system, GIS 102, provides necessary operating information to the human operator of the alert system according to the invention. For example, basic data of mudflow in the monitored area, location information, specific geological conditions, location of installed wireless sensor modules, as well as roads leading to these locations, are displayed for viewing by the human operator of the alert system. Incoming data as provided by the on-site sensor modules are submitted to the data processing system, DPS 105, for processing in accordance with the preset algorithms in determining whether to enter into an alert status. The sensory and communications control, SCC 103, sets operating parameters for the wireless sensor modules deployed in the monitored areas, such as, the frequency of data submission by the wireless sensor modules (i.e., time intervals of submission of collected data).

The transmission mode of the wireless communications units in each of the sensor modules is dependent on the network used to construct the alert system according to the invention. Based on the type of the network used, transmission modes such as Short Message Service (SMS), Unstructured Supplementary Service Data (USSD) and General Packet Radio Service (GPRS) can be selected according to system requirements. Furthermore, the operating status of each of the wireless sensor modules deployed on site is also monitored in the control center. The control center has available the real-time status of the deployed sensors regarding whether a sensor is in active status or is malfunctioning. The SCC 103 is also used to oversee the maintenance operations conducted in the functional components of the alert system according to the invention. The weather data receiving subsystem, WDRS 106, is used to gather weather information, which is essential to the proper prediction imminent disasters. The alert and rescue management subsystem, ARMS 107, manages the issuance of alert should the control center determine that a disaster is likely within a monitored area.

Referring to FIG. 8, the control center 880, based on its analysis of collected data, has determined to issue an alert for the monitored area 802. People in the area 802 need to be informed, rescued or evacuated. The control center 880 has the option to issue alert through alert issue stations 832 and 833 using voice or sound messages. Alternatively, the control center 880 has the option of informing people in the area 802 through Short Message Service (SMS) in a broadcast. Control center 880 may also alert the rescue unit 843 in the area 802 or the rescue unit 842 near the area 802, who can then accordingly execute rescue or evacuation operations.

The database and web service subsystem, DWSS 108, stores information needed for operating the alert system according to the invention. The stored information can include corresponding geographic conditions in the proximity of the deployed wireless sensor modules as well as contact information of personnel operating in nearby areas. For example, DWSS 108 can maintain a database registering mobile phone information of people staying in the monitored area. DWSS 108 of the alert system according to the invention can accept subscriber registration by anyone who needs to stay inside the monitored area. Alternatively, Interactive Voice Response (IVR) may also be used to register a person entering the monitored area.

DWSS 108 can also maintain a database that stores relevant information of all the wireless sensor modules deployed to the monitored area. For example, DWSS 108 can store information regarding the location of installation, the total number of modules, type, programming parameters, firmware version of each module. DWSS 108 can also maintain a database of communications information for each and every wireless sensor modules deployed to the monitored area. Moreover, DWSS 108 may host a web service for authorized personnel to have convenient access to the alert system regarding information such as the location and characteristics of potential mudflow inside the monitored area, whenever human intervention is required in determining whether to issue an alert.

Decision and support subsystem, DSS 104, allows a human operator of the alert system according to the invention to manually set and adjust processing priorities of each monitored area in the entire alert system. In general, monitored areas having higher disaster risk are monitored more closely and accordingly allowed higher processing priorities. DSS 104 can also assign priority rescue resources to the disaster areas.

The software system 100 as depicted in FIG. 10 is advantageously employed to run an alert system and method for monitoring geographic or natural disasters utilizing a telecommunications network in an effective, efficient, flexible and timely manner. Such an alert system according to the invention can drastically reduce the loss of human life and property in disaster-prone regions since timely warnings can be issued in advance.

It would be apparent to one skilled in the art that the invention can be embodied in various ways and implemented in many variations. For instance, a network of computers is described herein in illustrating various embodiments of the invention. The invention is accordingly applicable in this and other types of networks, such as a metropolitan area network (MAN), a wide area network (WAN), a local area network (LAN) or even wireless communications networks for mobile phones and personal digital assistant (PDA) devices. Such variations are not to be regarded as a departure from the spirit and scope of the invention. In particular, the process steps of the method according to the invention will include methods having substantially the same process steps as the method of the invention to achieve substantially the same results. Substitutions and modifications have been suggested in the foregoing Detailed Description, and others will occur to one of ordinary skill in the art. All such modifications as would be obvious to one skilled in the art are intended to be included within the scope of the following claims and their equivalents.

We claim:

1. An alert system for monitoring disasters in at least one monitored area, the system comprising:

- a telecommunications network having service coverage over said at least one monitored area;
- at least one wireless sensor module provided at a selected location inside said at least one monitored area, each of said at least one module further comprising:
  - at least one sensor configured to collect geographic and geological data;
  - a microcontroller configured to convert the collected data into a suitable transmission format; and
  - a wireless communications unit configured to transmit said collected data in an unstructured supplementary service data transmission mode; and
- a control center, implementing an alert control system including:
  - a data processing system configured to process said collected data from said at least one wireless sensor module to determine the likelihood of disaster; and
  - an alert and rescue management subsystem operable to issue a disaster alert signal.

2. The system of claim 1 wherein said telecommunications network is a Global System for Mobile communications network.

3. The system of claim 1 wherein said wireless sensor module further comprises a mobile communications device supporting Global System for Mobile communications service.

4. The system of claim 1 further comprising at least one alert issue station relaying said disaster alert throughout said at least one monitored area.

5. The system of claim 1 wherein said telecommunications network further comprises a long-distance radio telecommunications system for providing communications coverage for said at least one monitored area.

6. The system of claim 1, wherein said at least one wireless sensor module further comprising photo interrupters, proximity switches, sliding switches, mercury switches, ultrasonic sensors and strain gauges.

7. The system of claim 1, wherein said collected data further comprising water level, earth movement, position shifts, vibration and acceleration.

8. The system of claim 1, said at least one wireless sensor module further comprising a power supply providing operational power thereto.

9. The system of claim further comprising:

- a user interface; and
- a geographic information system providing operating information for said alert system.

10. The system of claim 1 further comprising a sensory and communication control setting operating parameters for said at least one wireless sensor module and overseeing maintenance operations.

11. The system of claim 1 further comprising a decision and support subsystem setting processing priorities for said collected data.

12. The system of claim 1 further comprising a weather data receiving subsystem gathering weather information.

13. The system of claim 1 further comprising:

- a database and web server subsystem.

14. The system of claim 9, wherein said operating information further comprising location of mudflow, geological conditions in said at least one monitored area, location of said at least one wireless sensor module.

15. The system claim 13, wherein said database and web service subsystem stores information comprising subscriber information to said alert system, location and total number of said at least one wireless sensor module, geographic and geological conditions of said at least one monitored area.

16. The system of claim 13, wherein said database and web service subsystem hosts a web service allowing access to said alert system.

17. A method for monitoring disasters in at least one geographic areas comprising:

- providing communications coverage over said at least one monitored area with a telecommunications network;
- providing at least one wireless sensor module in said at least one monitored area;
- collecting geographic and geological data in said at least one monitored area;
- transmitting said geographic and geological data in the form of unstructured supplementary service data transmission mode or general packet radio service transmission mode to a control center;
- processing said collected data at a the control center;
- determining a likelihood of disaster based on said collected data; and
- issuing a disaster alert if the likelihood of disaster is determined to be relatively high.

18. The method of claim 17, wherein said telecommunications network is a Global System for Mobile communications network.

19. The method of claim 17 further comprising relaying said disaster alert throughout said at least one monitored area.

20. The method of claim 17 further comprising relaying said collected data to said control center using a microcontroller connected to said at least one wireless sensor module.

21. The method of claim 17, wherein said collected data further comprising water level, earth movement, position shifts, vibration and acceleration.

22. The method of claim 17 further comprising providing operating information for said alert system using a geographic information system.

23. The method of claim 22, said operating information further comprising location of mudflow, geological conditions in said at least one monitored area, location of said at least one wireless sensor module.

24. The method of claim 17, further comprising setting operating parameters for said at least one wireless sensor module and overseeing maintenance operations using a sensory and communication control.

25. The method of claim 17 further comprising gathering weather information using a weather data receiving subsystem.

26. The method of claim 17 further comprising setting processing priorities for said collected data.

27. The method of claim 17 further comprising providing subscriber information to said alert system, location and total number of said at least one wireless sensor module, geographic and geological conditions of said at least one monitored area in a database and web service subsystem.

28. The method of claim 17 further comprising hosting a web service for allowing access to said alert system.

29. An alert system for monitoring disasters in at least one monitored area, the system comprising:

a telecommunications network having service coverage over said at least one monitored area;

at least one wireless sensor module provided at a selected location inside said at least one monitored area, each of said at least one module further comprising:

at least one sensor configured to collect geographic and geological data;

a microcontroller configured to convert the collected data into a suitable transmission format; and a wireless communications unit configured to transmit said collected data in a general packet radio service transmission mode; and a control center, implementing an alert control system including:

a data processing system configured to process said collected data from said at least one wireless sensor module to determine the likelihood of disaster; and an alert and rescue management subsystem operable to issue a disaster alert signal.

* * * * *